Oct. 17, 1933.    W. L. RINGLING    1,930,728
OPERATING MEANS
Filed April 9, 1928
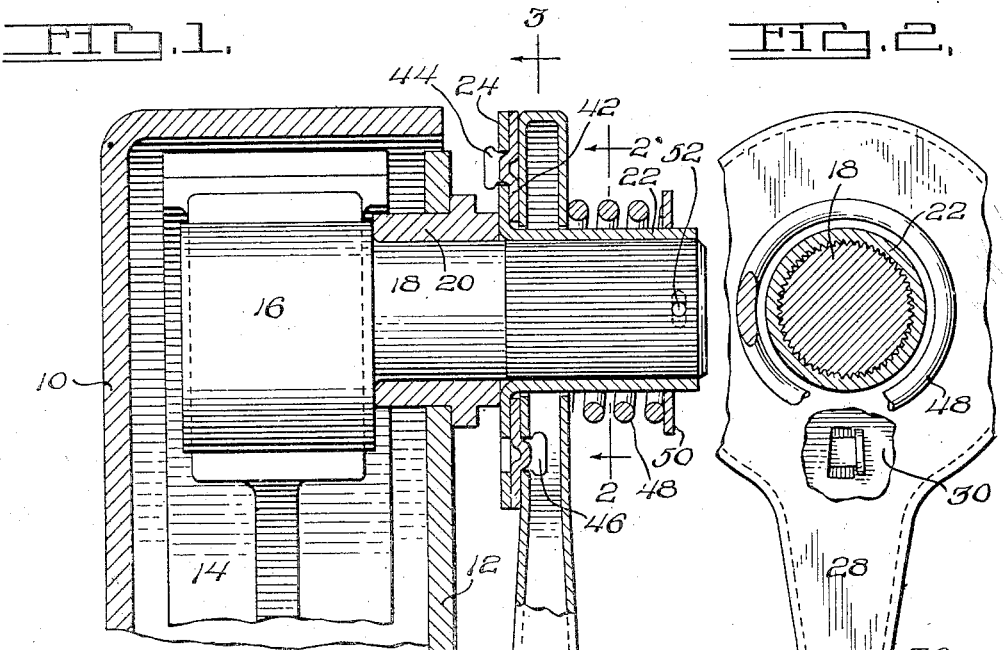
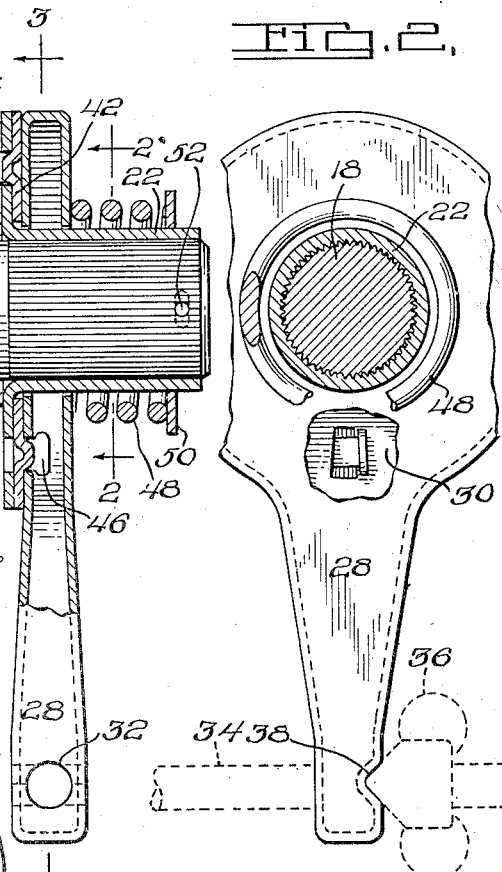
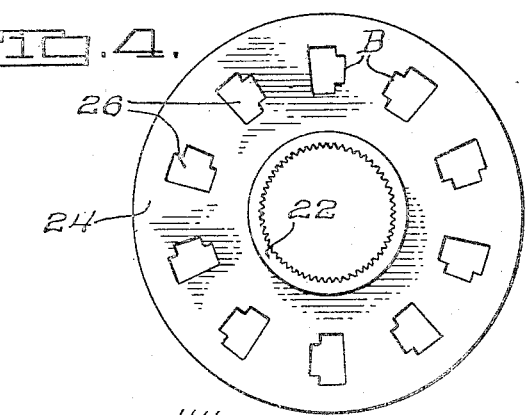
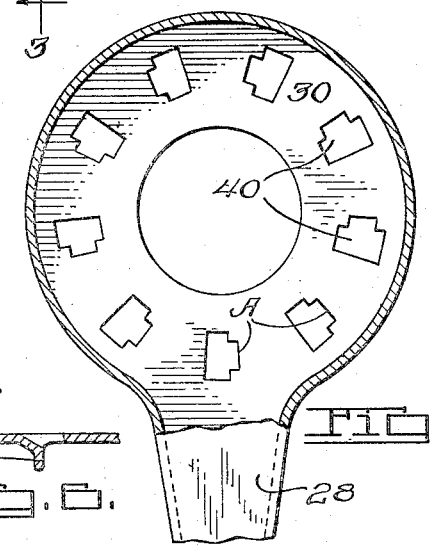
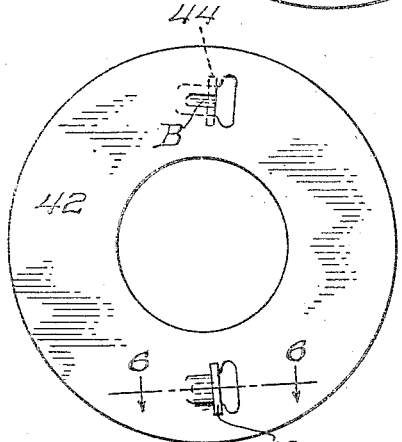
INVENTOR
Walter L. Ringling
BY
M. W. McConkey
ATTORNEY Patented Oct. 17, 1933

1,930,728

UNITED STATES PATENT OFFICE 1,930,728

OPERATING MEANS

Walter L. Ringling, South Bend, Ind., assignor to Bendix Brake Company, South Bend, Ind., a corporation of Illinois Application April 9, 1928. Serial No. 268,670

1 Claim. (Cl. 287—52.02)

This invention relates to means for operating mechanism such as brakes, and is illustrated as embodied in a novel operating device for a rear-wheel automobile brake. An object of the invention is to provide a simple and inexpensive operating device which can easily be adjusted.

One feature of the invention relates to securing a micrometer adjustment, by the use of a novel connector arranged between and interlocking with a member fixed on the operating shaft, and also with an operating lever which is angularly adjustable with respect to the shaft. In order to secure the desired micrometer adjustment, the connector interlocks with the fixed member in one number of relative angular positions, and with the lever in a different number of relative angular positions.

Another feature of the invention relates to the use of a coil spring, confined between the lever and a stop on the end of the shaft, to hold the lever against the connector and the connector against the fixed member.

Other features, including a novel lever construction and other desirable details of construction, will be apparent from the following description of one illustrative embodiment shown in the accompanying drawing, in which:

Figure 1 is a vertical section through the upper part of the brake and through the novel operating means;

Figure 2 is a section through the operating means, on the line 2—2 of Figure 1;

Figure 3 is a partial elevation of the lever, partly broken away in section on the line 3—3 of Figure 1;

Figure 4 is a side elevation of the member fixed on the camshaft;

Figure 5 is a side elevation of the connector; and

Figure 6 is a partial section through the connector on the line 6—6 of Figure 5.

In the arrangement illustrated, the brake includes a rotatable brake drum 10, at the open side of which is a support such as a backing plate 12, and within which is arranged the friction means 14 operated by means such as a cam 16. Cam 16 has an operating shaft 18 journaled in a bracket 20 bolted to the backing plate 12. The present invention relates to the means for operating the shaft 18.

The operating means shown includes a member fixed on the shaft, and having an internally-serrated tubular central boss 22 sleeved on the serrated end of the shaft, and having an outwardly-extending flange 24. This member may be pressed or drawn from sheet steel, the serrations afterwards being formed by broaching or otherwise. The flange 24 is formed with a series of angularly-spaced openings 26, preferably of keyhole shape, all facing the same direction.

The lever is shown as made by welding together face to face two channel-section steel stampings 28 and 30, thus forming a hollow lever provided with an opening 32 for the passage of a brake rod or the like 34. The brake rod 34 has a wing nut 36 to operate the lever, shown formed with a projection on its base to seat in a transverse depression formed by registering notches 38 formed in the two stampings 28 and 30. The lever is also formed with a series of angularly-spaced openings 40, of keyhole shape, facing the other way from openings 26 and differing in number from openings 26. For example there may be ten openings 26 and nine openings 40. Lever 28—30 is shown sleeved freely on boss 22.

Between lever 28—30 and flange 24, there is arranged a connector 42, having one or more T-shaped tongues 44 pressed out in one direction and adapted to interlock with openings 26, and also having one or more similar tongues 46 pressed out in the opposite direction and adapted to interlock with the openings 40.

A coil spring 48 sleeved on boss 22 is confined between the lever and a stop such as a washer 50 held by a pin 52 passing through boss 22 and shaft 18. This spring holds the lever against the connector 42, and the connector against flange 24.

It will be observed that a shift of the connector to the next opening 26 gives a change of 36° of the lever, while shifting it to the next opening 40 in the opposite direction moves the lever 40° in the other direction giving a net change of only 4°.

While one illustrative embodiment has been described in detail, it is not my intention to limit the scope of the invention to that particular embodiment, or otherwise than by the terms of the appended claim.

I claim:

Operating means comprising, in combination, a shaft, a member fixed on the shaft and having a tubular part sleeved on the shaft and a flange at one end of said part, a rotatable lever freely pivotally embracing the tubular part of said member, a connector between said flange and the lever, a stop adjacent the end of the shaft, and a coil spring sleeved on the tubular part and compressed between the lever and said stop.

WALTER L. RINGLING.